Jan. 10, 1956 F. A. ROBERTON 2,730,388
DETACHABLE JOINT CONSTRUCTION
Filed Sept. 23, 1950 2 Sheets-Sheet 1
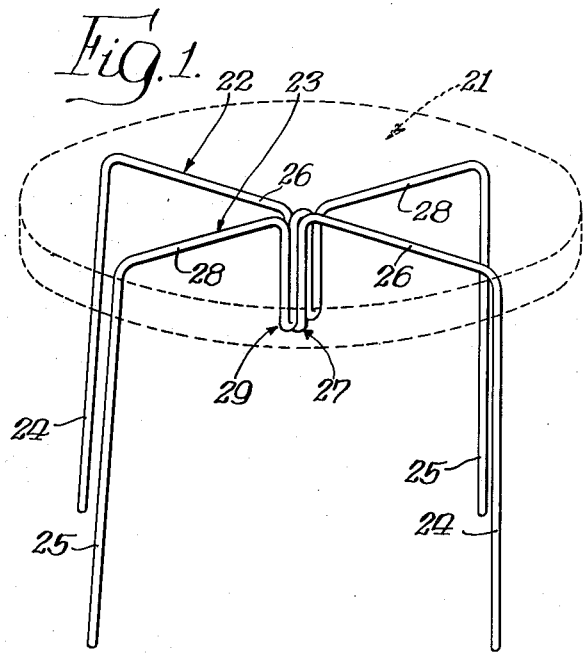
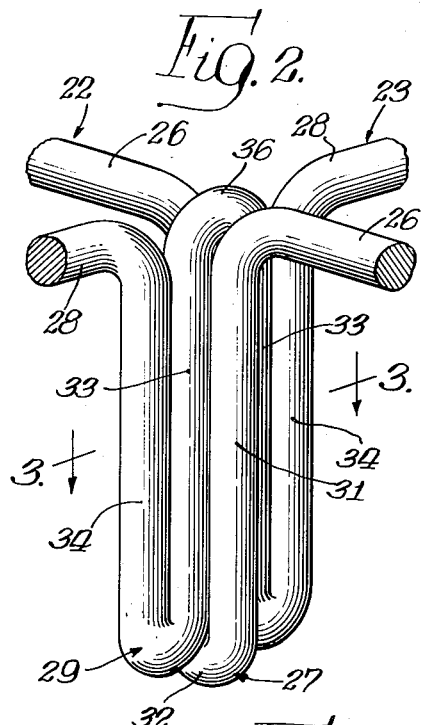
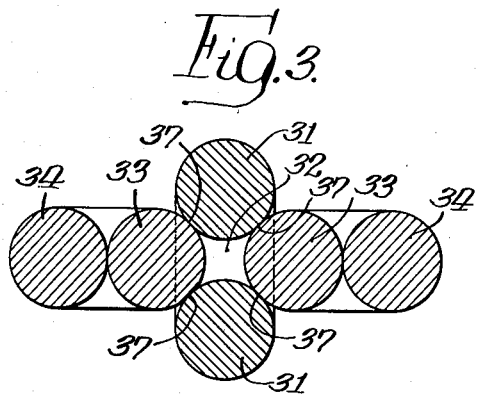
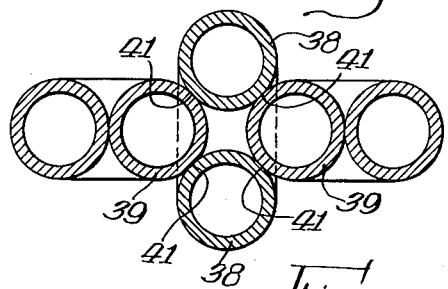
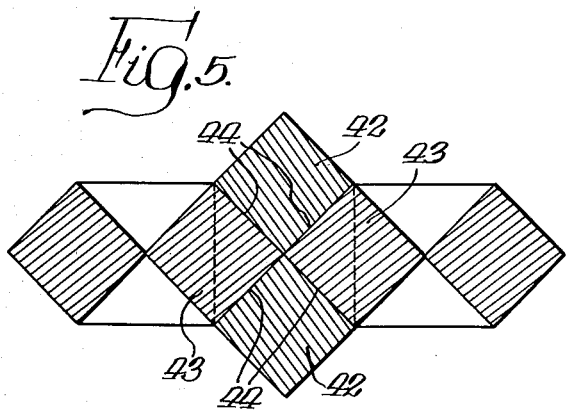
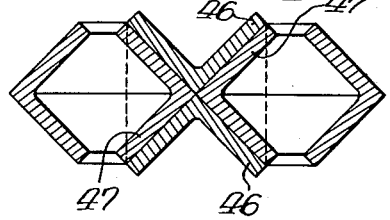
INVENTOR.
Frederic A. Roberton,
BY
Davis, Lindsey, Hibben & Noyes
Atty's.

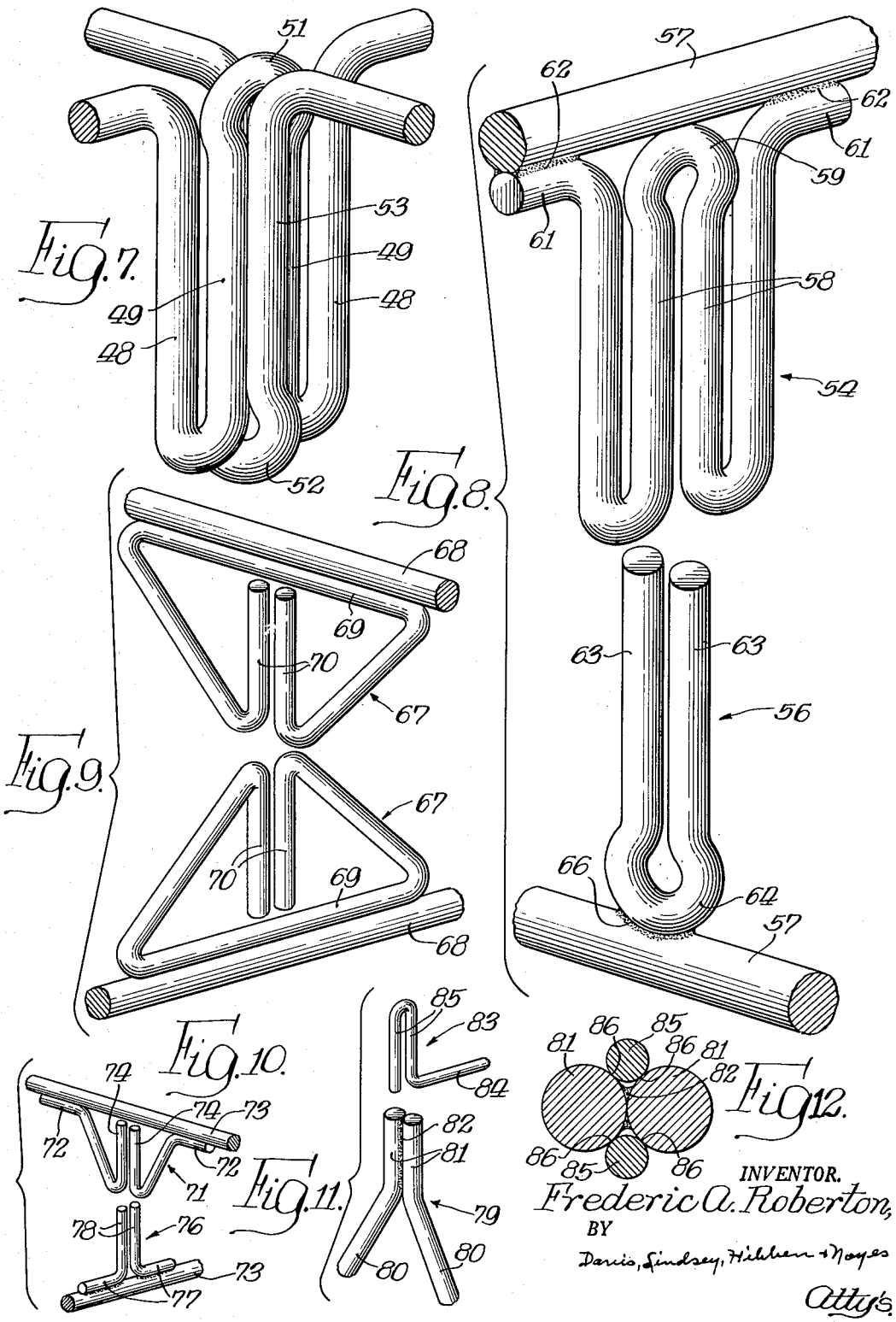

United States Patent Office 2,730,388
Patented Jan. 10, 1956

2,730,388

DETACHABLE JOINT CONSTRUCTION

Frederic A. Roberton, Oak Park, Ill.

Application September 23, 1950, Serial No. 186,325

10 Claims. (Cl. 287—103)

This invention relates to a novel structural connection and more particularly to a novel joint structure for use in detachably connecting structural elements.

Detachable connections are widely used whenever it is desired to interconnect a plurality of structural members in a non-permanent manner to permit easy assembly and disassembly thereof. For example, a common means of assembling partitions in wooden or cardboard containers is to provide complementary interfitting slotted portions in the partitions whereby to retain the partition at right angles when in assembled relation. Similar slotted joints have been employed in other articles such as supporting frames and the like. However, in joints of this type as heretofore known the complementary slots are usually of different widths to permit easy interfitting of the parts and when in assembled relation the slotted portions generally have a relatively loose and non-resilient fit. Consequently, such joint structures are not sufficiently rigid for many purposes and do not provide adequate resistance to twisting or angular displacement of the assembled elements.

Accordingly, it is a primary object of my invention to provide a novel detachable joint structure which is simple and economical to manufacture but which is not subject to the disadvantages of the simple detachable joints heretofore known.

Another object of the invention is to provide a novel detachable joint structure wherein the complementary parts of the joint are resiliently interengaged to retain the same in substantially rigid angular relation.

A further object of the invention is to provide a novel detachable joint structure which is simple in construction and operation but possesses sufficient structural rigidity when in assembled relation to find wide application in a variety of fields, such as in knock-down furniture and the like.

An additional object of the invention is to provide a novel detachable joint structure having resiliently interfitting parts which are capable of being mounted on or otherwise incorporated in widely different structural assemblies for varying uses.

Still another object of the invention is to provide novel means for detachably connecting complementary pieces of rod stock for a wide variety of structural purposes.

Other objects and advantages of the invention will become apparent from the subsequent detailed description taken in conjunction with the accompanying drawings wherein:

Fig. 1 is a perspective view of a knock-down table having a joint structure comprising one specific embodiment of my invention;

Fig. 2 is an enlarged perspective view of the joint portion of the article shown in Fig. 1;

Fig. 3 is a cross-sectional view taken along the line 3—3 of Fig. 2;

Figs. 4 to 6 are cross-sectional views similar to Fig. 3 but showing the use of differently shaped structural materials to form the joint structure;

Fig. 7 is a perspective view similar to Fig. 2 but showing a slightly different embodiment of the invention;

Figs. 8 to 11 are exploded perspective views each showing a different modification of the joint structure of my invention; and Fig. 12 is an enlarged cross-sectional view showing the relationship of the parts when the joint structure of Fig. 11 is in assembled condition.

Broadly speaking, the novel joint structure of the present invention includes a pair of cooperating joint members each having a pair of elongated elements with at least one such pair of elements being arranged for resilient coaction. As will hereinafter appear, in the preferred embodiments of the invention, one or both pairs of elongated elements are transversely spaced for resilient interengagement. The two joint members are so arranged that the spaced resilient elements of one member are adapted for longitudinal slidable engagement with the complementary joint member in relatively tight frictional contact therewith. The resilient action of one or both joint members holds the parts together in snug angular relation, preferably at right angles, with a camming action being exerted between the parts to provide structural rigidity and resistance to twisting or angular displacement when the joint is in assembled condition.

Referring now to Figs. 1 to 3 of the drawings, there is shown merely by way of illustration, one specific form of the joint structure of my invention as embodied in a knock-down table or the like. A table top 21 is removably secured (by means not shown) to a supporting structure comprising a pair of interlocked supporting members indicated generally at 22 and 23. Each of the members 22 and 23 is preferably formed from a continuous length of round rod stock having downwardly bent end portions, as at 24 and 25, respectively, to provide supporting legs for the table. The legs 24 of the member 22 are connected by means of an integral horizontally extending cross portion 26, the cross portion 26 being provided adjacent its center with a downwardly extending loop 27. The supporting member 23 is also formed with an integral horizontally extending cross portion 28 connecting the legs 25 and provided adjacent its center with a double loop, indicated generally at 29.

The single loop 27 consists of a pair of transversely spaced elongated elements 31 which are resiliently connected at their lower ends by an integral U-shaped portion or bend 32. The double loop 29 in the supporting member 23 consists of two spaced loop portions wherein the rod stock is doubled back on itself in substantially contiguous relationship to provide closely adjacent pairs of inner elements 33 and outer elements 34, the inner elements 33 being disposed in transversely spaced resilient relation by means of a central connecting U-bend 36. As will be understood particularly from Fig. 2, the spaced portion of the single loop 27 is adapted to be slidably interfitted with the corresponding spaced portion at the center of the double loop 29 whereby to provide the desired detachable assembly. When the loop 27 is in detached condition prior to assembly of the joint, the elements 31 taper slightly toward each other away from the bend 27 and a similar condition exists with respect to the elements 33 of the double loop 29. When the joint is assembled, however, the respective pairs of elements 31 and 33 are spread apart slightly to substantially parallel relation whereby to provide snug longitudinal engagement therebetween.

The novel assembled relation of my joint structure is best seen in Fig. 3 wherein the spacing between the elements 33 of the double loop and the spacing between the elements 31 of the single loop are of substantially the same width so that the elements 31 and 33 are disposed in snug-fitting peripheral or tangential engagement along substantially their entire lengths. In addition, it will be seen that each of the elements 31 is in resilient contact with both of the elements 33 and vice versa, as indicated at 37. With this arrangement, the supporting members 22 and 23 are effectively and firmly held in desired right-angular relationship, and as a result of the four-point peripheral contacts 37, the pairs of spaced elements 31 and 33 exert a mutual camming action whereby to resist relative twisting or angular displacement between the members 22 and 23.

Although the joint structure illustrated in Figs. 1 to 3 is formed from a continuous length of round rod stock, it is also within the scope of my invention to employ rod stock or other elongated structural material having different cross-sectional shapes. Thus, in Fig. 4 a joint structure of the same general character as that illustrated in Figs. 1 to 3 is shown wherein the members 22 and 23 are formed from round tubular material whereby to provide a pair of transversely spaced and resiliently connected tubular elements 38 and a corresponding pair of tubular elements 39. The pairs of tubular elements 38 and 39 are interlocked in peripheral camming contact, as at 41, whereby to provide the same resilient camming action as in Fig. 3. In Fig. 5 a generally similar joint structure is illustrated in cross-section wherein the interconnected members are formed from square rod stock. The pairs of elongated elements, indicated at 42 and 43, respectively, are disposed in flatwise side contact, as at 44, each of the elements 42 and 43 engaging the opposite pair of elements along two of its flat sides. In Fig. 6 a joint structure is shown having the same general relationship as the joint shown in Fig. 5 but employing extruded members of L-shaped cross-section instead of square stock. The coacting pairs of elongated elements are indicated at 46 and 47, respectively, these elements being arranged with their vertexes extending inwardly so that each of the flat sides or legs of the elements 46 and 47 is in flatwise engagement with the corresponding elements of the coacting member thereby providing substantially the same type of interlocking fit as in the joint structure of Fig. 5. In the embodiments of the invention shown in Figs. 5 and 6 the flat contacting surfaces provide greater frictional engagement than in the case of the round elements and therefore tend to hold together more strongly. It will be evident from the drawing that these flat contacting surfaces provide substantially greater contact area for resisting relative twisting between the joint members as compared to the substantially single point or line contact between the joint members formed from round or tubular stock.

In Fig. 7 I have illustrated a modification of the joint structure shown in Fig. 2. In this embodiment of the invention the two downwardly extending loop portions of the double loop member have their legs, indicated at 48 and 49, respectively, disposed in slightly spaced relation and the central U-bend, indicated at 51, which connects the legs 49 at the center portion of the double loop is formed on an enlarged radius. Similarly, in the single loop member of the joint structure a U-bend 52 connecting the spaced elongated elements, indicated at 53, is also of enlarged size. As a result of this construction, the coacting loop portions of the two joint members are more readily provided with the desired preformed tapered conformation between their elongated sides or legs. In other words, when the respective members of the joint structure are in detached condition (not shown), the oppositely disposed elements 53 taper inwardly toward each other from the bend 52 and a similar condition exists with respect to the elements 49 just as in the previously described forms of the invention. Consequently, by means of the enlarged bends 51 and 52, the coacting pairs of elements 49 and 53 are disposed in tapered relation so that the tapered portions are forced or spread apart during assembly of the joint structure whereby to impart greater resiliency and mutual clamping action. Moreover, the enlarged radius of the bends 51 and 52 minimizes any tendency toward weakening the rod stock as a result of sharp bends or as a result of repeated flexing of the bends during attachment and detachment of the joint members. Furthermore, the provision of the enlarged bends 51 and 52 facilitates the use of rod stock of relatively large diameter.

Fig. 8 illustrates a different manner of utilizing the principle of my invention. Here the joint structure per se comprises a pair of separate or independent joint members 54 and 56 which can be suitably secured to a pair of structural members of any character, illustrated fragmentarily at 57, which it is desired to connect in a detachable manner. The joint member 54 is of the same type as the double loop member illustrated in Fig. 7 and comprises a single length of round rod stock having a double loop portion formed therein with the elongated slightly tapered elements 58 thereof being transversely spaced and resiliently interconnected by an enlarged bend 59. The ends of the rod stock designated by the numeral 61 are bent outwardly and horizontally and are welded to the member 57, as at 62. The joint member 56 comprises a single loop portion having a pair of transversely spaced elongated elements 63 which are resiliently connected in slightly tapered relation by an enlarged bend 64, the bend 64 being welded to the corresponding member 57, as indicated at 66. It will be understood that the joint members 54 and 56 may be assembled and disassembled in the same manner as hereinbefore described and that the coacting elements 58 and 63 are adapted to interfit in the same resilient manner as in the previous forms of the invention. Although the joint members 54 and 56 are described as being welded to the structural members 57, it will be apparent that other suitable fastening means may be employed.

Fig. 9 illustrates still another modification of the joint structure of my invention wherein a pair of identical joint members 67 are provided in the form of independent units attachable, as by welding or the like, to structural members indicated fragmentarily at 68. Each of the joint members 67 consists of a length of round rod stock bent to a generally triangular form having a base portion 69 secured to the corresponding member 68 and having its end portions bent inwardly toward the base 69 and slightly tapered to provide a pair of elongated transversely spaced elements 70. As a result of the integral triangular construction, it will be seen that the spaced elements 70 are disposed for resilient coaction with each other and that the respective joint members 67 may be slidably interengaged to provide substantially the same resilient camming relation as in the previously described forms of the invention. The triangular construction of this form of the invention has the added advantage of providing a more rigid structure than the other forms heretofore described because of the reinforcing side-by-side engagement between the base portions 69 and the corresponding attaching portions of the members 68.

Fig. 10 constitutes a modification of the joint structure illustrated in Fig. 9 in that the joint members are each formed from a separate pair of elements adapted to be welded or otherwise secured to structural members. Thus, an uppermost generally triangular joint member 71 is shown as comprising a pair of angularly bent lengths of round rod stock having their outermost ends, indicated at 72, welded or otherwise secured to a structural member 73 and having their innermost ends, indicated at 74, bent inwardly toward the structural member 73 in slightly tapered and transversely spaced relation. A lowermost joint member 76 is shown as comprising a pair of L-shaped elements each secured along one leg 77 to the corresponding structural member 73 and having its other leg extending outwardly from the member 73 to provide a pair of slightly tapered and transversely spaced elements 78. It will be understood that the elements 78 are adapted to interfit with the elements 74 in the same general manner as hereinbefore described with the angularly bent conformation of the separate joint elements imparting the desired resiliency and camming action.

Still another embodiment of the invention is illustrated in Figs. 11 and 12, this form of the invention differing primarily from the previously described forms in that only one of the complementary joint members is provided with a resilient construction between its coacting elements. One joint member, indicated fragmentarily at 79, comprises a pair of elongated elements 80 having upwardly extending end portions 81 which are welded together, as at 82, to provide a rigid connection therebetween. The lower portions of the elements 80 (not shown) may be secured to a structural member or may conveniently comprise a standard or support, e. g. in the form of an A-frame. A complementary joint member 83 comprises a looped portion at the end of a length of round rod stock 84 having a smaller diameter than the rod stock employed in the joint member 79. Thus, the joint member 83 is provided with a pair of slightly tapered oppositely disposed elongated elements 85 which are resiliently connected and adapted to fit over the welded ends 81 of the joint member 79 when in assembled relation. Although only the elements 85 of the joint member 83 are disposed in spaced resilient relation, it will be seen in Fig. 12 that the same four-point peripheral contact, as at 86, is provided between the respective pairs of elements 81 and 85 so that a tight-fitting resilient camming effect is still realized in the assembled joint.

From the foregoing description it will be seen that my invention provides a relatively simple detachable joint structure capable of a wide variety of modifications to meet various structural requirements. In each case the joint when in assembled condition is characterized by a snug-fitting resilient camming action between the coacting portions of the joint whereby to retain a pair of structural members in desired angular relation with substantial rigidity. The joint structure can be conveniently formed from continuous lengths of structural material such as metal rod stock of varying cross-sectional shape, plastic, and the like. In addition, the invention lends itself to a multitude of applications including for example its use in connection with the legs of tables or stools, bed frames, wall brackets and wall fixtures, numerous types of knock-down furniture, and the like. By way of further illustration, the embodiment of the invention illustrated in Figs. 11 and 12 is of particular utility in connection with sawhorses, platform bases, scaffolding, and numerous like constructions.

Although the invention has been described in connection with certain specific structural embodiments, it will be understood that various alternatives and modifications may be resorted to without departing from the scope of the invention as defined in the appended claims.

I claim:
1. A detachable joint structure comprising a pair of coacting joint members each including a pair of elongated elements with at least one pair of said elements being transversely spaced and arranged for resilient coaction therebetween, said one pair of elements being longitudinally and slidably interfitted in side-by-side assembled engagement with the other pair of said elements, said pairs of elements being detachable by longitudinal sliding movement therebetween, and the transverse spacing between said one pair of elements when detached from the other pair of elements being sufficiently restricted to require said one pair of elements to be spread apart slightly during said assembled engagement with said other pair of elements whereby to provide snug longitudinal contact therebetween with the resilient coaction between said one pair of elements retaining the latter in said snug contact and whereby said elements exert a mutual resilient camming action against each other for retaining said joint members in predetermined angular relation.

2. A detachable joint structure comprising coacting pairs of elongated elements, and means for resiliently retaining at least one of said pairs of elements in transversely spaced relation, said one pair of elements being interfitted in longitudinally slidable and interlocking assembled engagement with the other pair of elements, said pairs of elements being detachable by longitudinal sliding movement therebetween, and said one pair of elements when detached from the other pair of elements being disposed in slightly tapered transversely spaced relation with the transverse spacing therebetween being sufficiently restricted to require said one pair of elements to be spread apart slightly to substantially parallel relation during said assembled engagement with said other pair of elements whereby each of said pairs of elements is retained in close-fitting resilient contact with the opposite pair of elements during said assembled engagement and whereby each of said elements exerts a resilient camming action against the contiguous elements for imparting structural rigidity and resistance to angular displacement between the respective pairs of elements.

3. A detachable joint structure comprising coacting pairs of transversely spaced elongated resilient elements, said pairs of elements being interfitted longitudinally in frictional assembled engagement along the lengths thereof and said pairs of elements being detachable by longitudinal sliding movement therebetween, each of said pairs of elements when in detached relation from the other pair of elements being in slightly tapered transversely spaced relation with the transverse spacing therebetween being sufficiently restricted to require the pair of elements to be spread apart slightly to substantially parallel relation during said assembled engagement with the other pair of elements whereby each pair of elements is retained in close-fitting contact with the other pair of elements as a result of the resilient action therebetween during said assembled engagement and whereby said elements also exert a mutual resilient camming action against each other for providing resistance to twisting of the assembled joint.

4. A joint structure as defined in claim 3 but further characterized in that said pairs of elongated elements have a round cross-sectional shape resulting in a mutual resilient camming action at the points of peripheral contact between the elements whereby the joint members are retained in assembled relation with the planes thereof intersecting substantially perpendicularly.

5. A joint structure as defined in claim 4 but further characterized in that one pair of round elements have a different diameter than the other pair of round elements.

6. A detachable joint structure comprising coacting pairs of elongated elements, one of said pairs of elements being rigidly secured together along the lengths thereof and the other of said pairs of elements being transversely spaced and arranged for resilient coaction therebetween, said pairs of elements being longitudinally and slidably interfitted in side-by-side assembled engagement and said pairs of elements being detachable by longitudinal sliding movement therebetween, the resilient action of said other pair of elements serving to retain the elements in close-fitting contact during said assembled engagement whereby said elements exert a mutual resilient camming action against each other at the points of contact therebetween.

7. A detachable joint structure comprising a pair of elongated members formed with integral loop portions opening oppositely to each other, each of said loop portions having a pair of transversely spaced elongated elements resiliently connected at one end by a U-bend, said pairs of elements being longitudinally and slidably interfitted in interlocking frictional assembled engagement with each other and said pairs of elements being detachable by longitudinal sliding movement therebetween, and the transverse spacing between each pair of said elements when in detached relation from each other being sufficiently restricted to require each pair of elements to be spread apart slightly during said assembled engagement whereby to provide close-fitting contact between the respective pairs of elements longitudinally thereof with the resilient connections between said pairs of elements retaining the latter in said close-fitting contact and whereby said elements also exert a mutual resilient camming action against each other for retaining the planes of said loop portions at a predetermined angular relation.

8. A detachable joint structure comprising a pair of elongated members formed with integral loop portions opening oppositely to each other, one of said loop portions comprising a single outwardly bent loop having a pair of transversely spaced legs resiliently joined by a U-bend at their outermost ends, and the other of said loop portions comprising two outwardly bent loops having their innermost legs spaced transversely from each other and resiliently connected by an oppositely extending U-bend, said loop portions being longitudinally and slidably interfitted in interlocking assembled engagement between the respective pairs of spaced legs with said legs being retained in close-fitting resilient engagement and exerting mutual resilient camming action at the points of contact therebetween.

9. A joint structure as defined in claim 8 but further characterized in that said U-bends are formed on an enlarged radius and the respective legs of said loops being inwardly tapered toward each other when the joint members are detached, the tapering legs being spread apart slightly during said assembled engagement whereby to impart increased resiliency and camming effect to the assembled joint.

10. A detachable joint structure comprising a pair of coacting joint members each having a pair of elongated connecting elements, at least one of said members having a generally triangular shape and including elongated angularly bent portions forming the sides of the triangle and inwardly bent end portions forming its pair of connecting elements, said end portions being transversely spaced for resilient coaction therebetween and being longitudinally and slidably interfitted in interlocking assembled engagement with the connecting elements of said other member whereby said elements are retained in mutual close-fitting contact along the lengths thereof during said assembled engagement and whereby said elements exert a mutual resilient camming action against each other.

References Cited in the file of this patent

UNITED STATES PATENTS

| | | |
|---|---|---|
| 442,511 | Church | Dec. 9, 1890 |
| 1,871,809 | Lampert | Aug. 16, 1932 |
| 2,107,178 | Fackler | Feb. 1, 1938 |